US010997940B2

(12) United States Patent
Sheriber et al.

(10) Patent No.: US 10,997,940 B2
(45) Date of Patent: May 4, 2021

(54) ADJUSTING VIRTUAL MACHINE GPU REFRESH RATE TO REMOTE DESKTOP STREAM FRAME RATE

(71) Applicant: Red Hat Israel, Ltd., Ra'anana (IL)

(72) Inventors: Snir Sheriber, Ra'anana (IL); Uri Lublin, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 0 days.

(21) Appl. No.: 16/843,557

(22) Filed: Apr. 8, 2020

(65) Prior Publication Data
US 2020/0234672 A1 Jul. 23, 2020

Related U.S. Application Data

(63) Continuation of application No. 16/162,196, filed on Oct. 16, 2018, now Pat. No. 10,643,569.

(51) Int. Cl.
G09G 5/00 (2006.01)
G06F 9/455 (2018.01)
G06F 9/50 (2006.01)
G06F 9/38 (2018.01)

(52) U.S. Cl.
CPC ........... *G09G 5/001* (2013.01); *G06F 9/3877* (2013.01); *G06F 9/45558* (2013.01); *G06F 9/5077* (2013.01); *G09G 5/006* (2013.01); *G09G 2360/06* (2013.01); *G09G 2360/18* (2013.01)

(58) Field of Classification Search
None
See application file for complete search history.

(56) References Cited

U.S. PATENT DOCUMENTS

| 9,007,362 | B2 | 4/2015 | Shuster et al. |
| 9,924,134 | B2 | 3/2018 | Glen |
| 9,940,898 | B2 | 4/2018 | Cook et al. |
| 10,198,299 | B1 * | 2/2019 | Xu ........................ G06F 13/28 |

(Continued)

OTHER PUBLICATIONS

Gong et al., "A Benchmark for User-Perceived Display Quality on Remote Desktops", VMware Technical Journal, Dec. 2013, https://labs.vmware.com/vmtj/a-benchmark-for-user-perceived-display-quality-on-remote-desktops, 12 pages.

(Continued)

*Primary Examiner* — Robert J Craddock
(74) *Attorney, Agent, or Firm* — Womble Bond Dickinson (US) LLP

(57) ABSTRACT

A method of adjusting a virtual machine GPU refresh rate to match a given remote desktop stream frame rate is described. The GPU refresh rate of a virtual machine in a virtual machine server environment can be adjusted to a value stored either in the virtual machine GPU or a graphics driver of the virtual machine. The value represents a desired refresh rate or desired frame rate and can be determine by a plurality of parameters that characterized a remote desktop client or a hypervisor in the virtual machine server environment based on network conditions and/or other factors. A guest operating system of the virtual machine receives the frame rate information, and adjusts a refresh rate of a virtual machine GPU, which uses the adjusted refresh rate to draw framebuffers to create a portion of a remote desktop image for transmission to the remote desktop client.

20 Claims, 6 Drawing Sheets

(56) References Cited

U.S. PATENT DOCUMENTS

| | | |
|---|---|---|
| 2010/0226441 A1 | 9/2010 | Tung et al. |
| 2011/0126110 A1 | 5/2011 | Vilke et al. |
| 2014/0285502 A1 | 9/2014 | Hobbs |
| 2018/0293690 A1 | 10/2018 | Ray et al. |
| 2019/0188148 A1 | 6/2019 | Dong |

OTHER PUBLICATIONS

Martindale, "Nvidia's Prototype 1,700Hz Display Could Unlock Frame Rates for Future VR", Digital Trends, 2016 https://www.digitaltrends.com/virtual-reality/nvidia-1700hz-vr-display/, 10 pages.

* cited by examiner

ADJUSTING VIRTUAL MACHINE GPU REFRESH RATE TO REMOTE DESKTOP STREAM FRAME RATE

RELATED APPLICATIONS

This application is a continuation of U.S. patent application Ser. No. 16/162,196, filed on Oct. 16, 2018, which is herein incorporated by reference in its entirety.

TECHNICAL FIELD

Aspects of the present disclosure relate to adjusting virtual machine graphic processing unit (GPU) refresh rates to remote desktop stream frame rates.

BACKGROUND

A virtual machine can draw framebuffers at a certain rate (aka refresh rate). One way to send graphics of a remote desktop is by using video streaming. With this method, the framebuffers are encoded and sent as a video stream at a certain frame rate to a remote desktop client. However, when the refresh rate is different from the frame rate, CPU operations or GPU operations may be wasted.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
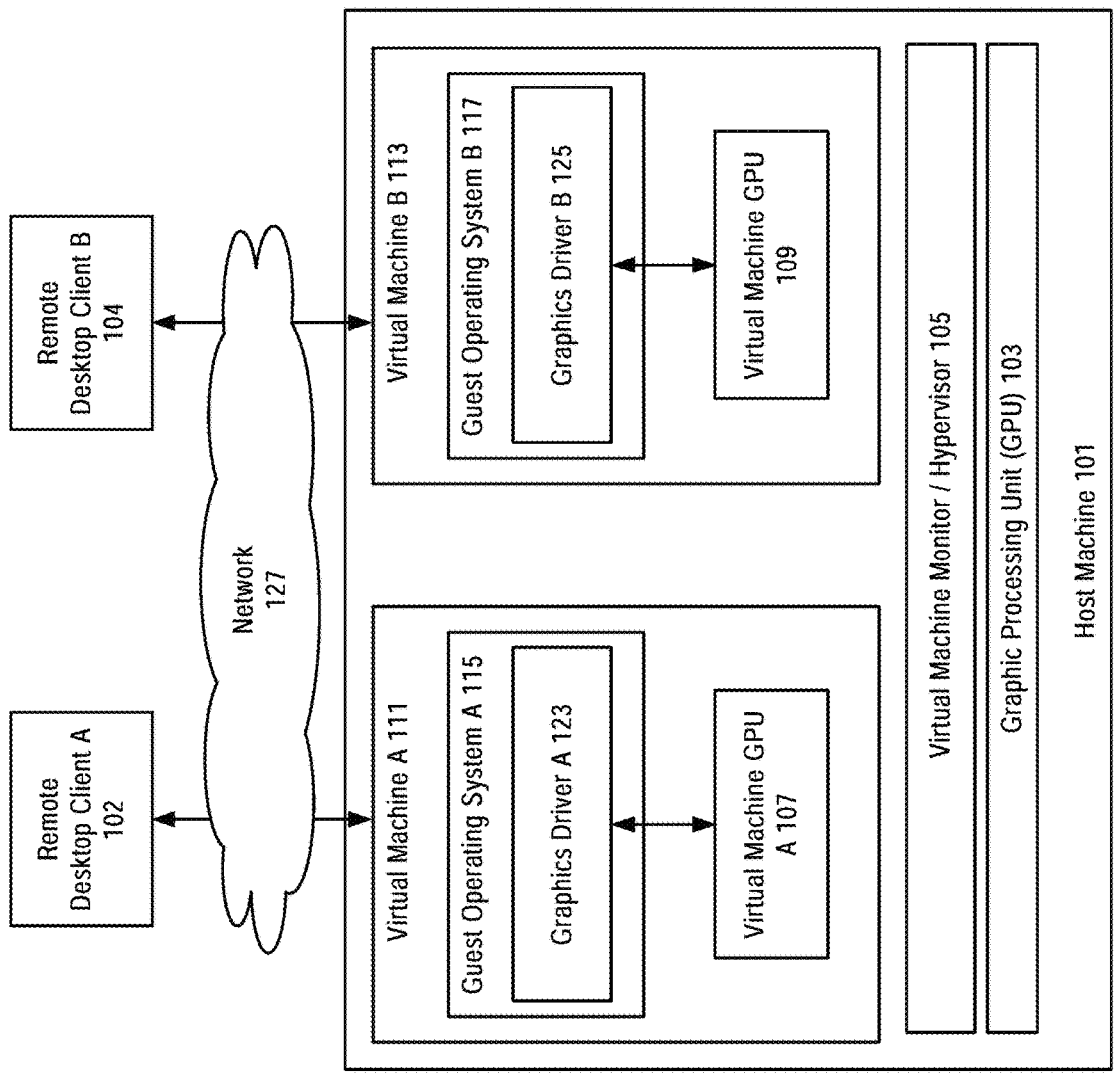
FIG. 1 illustrates a remote desktop environment in accordance with an embodiment of the disclosure.

Described herein are systems and methods for adjusting virtual machine GPU refresh rates to frame rates of remote desktop streams, so that CPU/GPU operations can be more efficiently utilized. In an embodiment, framebuffers are written by a virtual machine at a refresh rate, while graphics of a remote desktop (or remote desktop image) are rendered by a guest operating system, encoded at a frame rate, and sent as a video stream to a remote desktop client. Where the refresh rate and the frame rate are different, CPU operations or GPU operations may not be efficiently utilized. If the frame rate is higher, a single frame can be sent multiple times; if the refresh rate is higher, a rendered framebuffer may not be sent.

To address the above described deficiencies, various embodiments of the present disclosure are described to dynamically adjust the virtual machine GPU refresh rate to match the remote desktop stream frame rate to avoid such waste in GPU or CPU operations.

In an embodiment, a system for and a method of adjusting a GPU refresh rate of a virtual machine to match a given remote desktop stream frame rate is described. The adjustment of the GPU refresh rate of the virtual machine can be made directly using the virtual machine GPU device or through a graphics driver of the virtual machine. The virtual machine receives information for the given frame rate either from a remote desktop client or from a hypervisor, and stores the information in the graphics driver or the virtual machine GPU. A guest operating system of the virtual machine receives the frame rate information, and adjusts a refresh rate of the virtual machine GPU. The virtual machine GPU uses the adjusted refresh rate to draw or redraw framebuffers to create a remote desktop image for transmission to the remote desktop client.

In an embodiment, the guest operating system includes an agent, which can receive a desired refresh rate from the hypervisor or a remote desktop client. The desired refresh rate can be set initially, for example, to a refresh rate of a display device of the remote desktop client, or a constant e.g. 60 Hz or 30 Hz, or set by a user, or set according to network conditions.

In an embodiment, the desired refresh rate can be passed in a request from the remote desktop client and stored in the graphics driver of the virtual machine through the agent. The graphics driver can set the value of the desired refresh rate in the virtual machine GPU by changing settings of the virtual machine GPU. The virtual machine GPU can subsequently draw framebuffers at the desired refresh rate to create the remote desktop image.

In an alternative embodiment, the desired refresh rate of the virtual machine GPU can be provided by the hypervisor based on network conditions, and can be stored in the virtual machine GPU. The guest operating system can receive a value indicating the desired refresh rate from the virtual machine GPU via the agent, and send one or more commands via a graphical driver or one or more libraries to the virtual machine GPU to draw framebuffers at a refresh rate matching the value. The virtual machine GPU can also generate interrupts to the guest operating system at a rate specified by the value, to enable the virtual machine to draw framebuffers at the rate (i.e., refresh rate).

In an example, the desired refresh rate and the value of the refresh rate parameter can be determined based on the parameters of the request for creating the remote desktop session, or based on the given frame rate.

In an example, after receiving one or more portions of the remote desktop image encoded at the given frame rate, the remote desktop client can display the portions of the remote desktop image at the given frame rate.

FIG. 1 illustrates a remote desktop environment in accordance with an embodiment of the invention.

As shown in FIG. 1, a host machine 101 can include a host graphic processing unit (GPU) 103, and a virtual machine monitor (VMM)/hypervisor 105 that runs a number of virtual machines, for example, virtual machine A 111 and virtual machine B 113. Each virtual machine 111 or 113 can include a guest operating system 115 or 117, and a virtual machine GPU 107 or 108, which can be a software abstraction of the GPU 103 or another GPU, a partition of the GPU 103, or the whole GPU 103.

Each guest operating system 115 or 117 can include a graphics driver 123 or 125. Applications in each guest operating system 115 or 117 can use graphics driver 123 or 125 or through one or more libraries to communicate with the virtual machine GPU 107 or 109.

As further shown in FIG. 1, a remote desktop client 102 or 104 can be a client computer with a software application running on the client computer. The software application can communicate with a guest operating system 115 or 117 on the host machine 101 to create a desktop session. Each remote desktop client 102 or 104 can receive user inputs, such as keyboard and mouse input, and convert the input into a network compatible representation to be transmitted to the guest operating system 115 or 117. The guest operating system 115 or 117 can receive the network-compatible representation of the user input, and convert this representation into actual input messages, which are then sent to a message queue in a guest operating system 115 or 117, as if the input was generated at the guest operating system.

Each remote desktop client 102 or 104 can communicate with the host machine 127 using a remote desktop protocol (RDP). RDP can be executed via a TCP/IP networks and is internally divided into several layers, including a layer for handling the transmission of mouse and keyboard input and displaying output. The host machine 101 does not know which type of client machine will contact the host machine, and therefore needs to receive all parameters that characterize the remote desktop client 102 and 104. Example parameters include operating system used, protocol version, size of a display device of the remote desktop client, and refresh rate of the display device.

Figure 2:
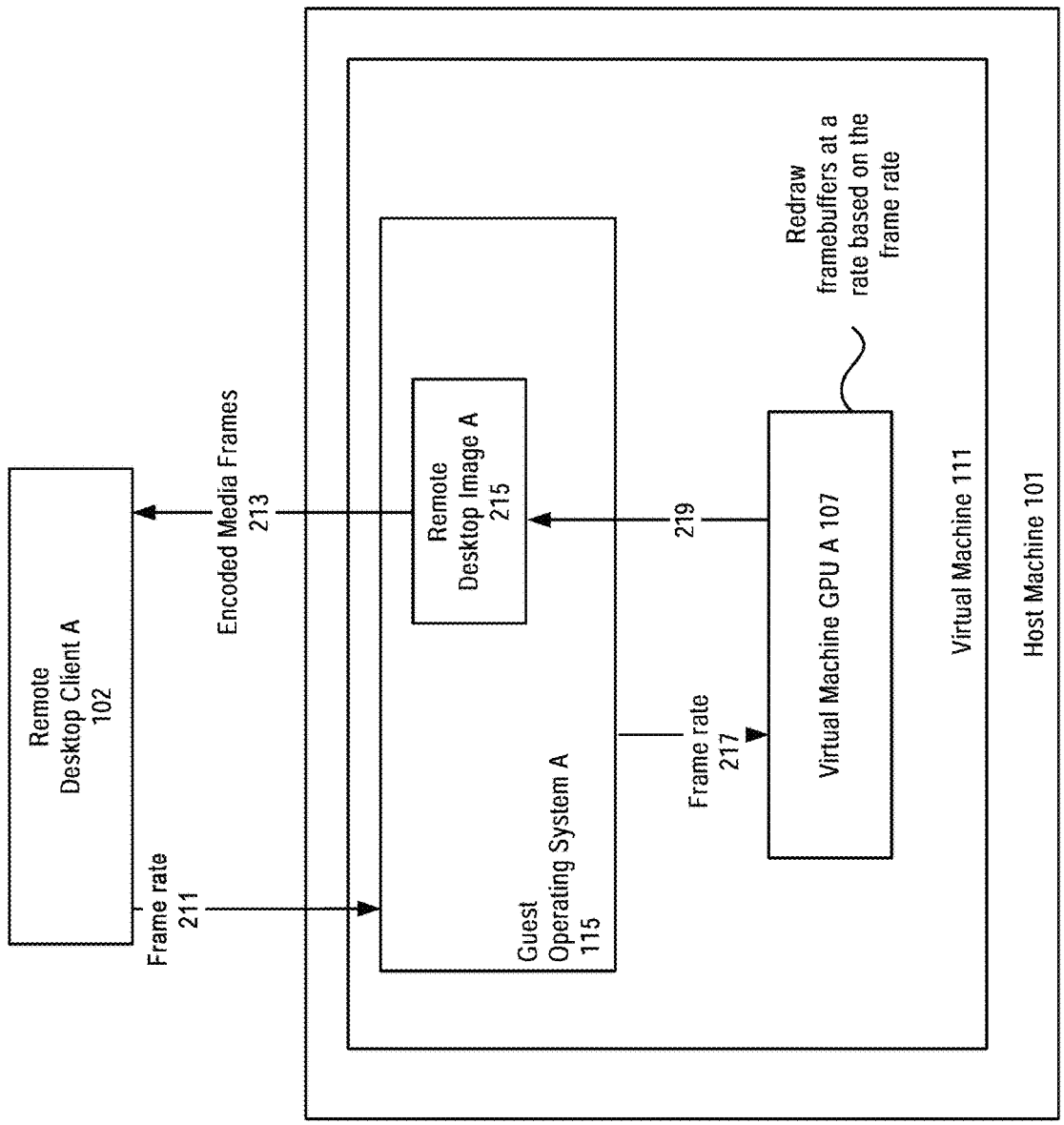
FIG. 2 illustrates a system for adjusting a virtual machine GPU refresh rate to match a frame rate of a remote desktop stream, in accordance with an embodiment of the invention.

FIG. 2 illustrates a system for adjusting a virtual machine GPU refresh rate to match a frame rate of a remote desktop stream, in accordance with an embodiment of the invention.

As shown in FIG. 2, the remote desktop client A 102 can send a request for creating a remote desktop session. The request can include parameters that characterize the remote desktop client. In an embodiment, the parameters can include a frame rate 211 used for encoding graphics transmitted from the virtual machine 111. In an alternative embodiment, the parameters can include information from which to derive the frame rate 211; for example, the information can be a refresh rate of the display device of the remote desktop client 102.

Upon receiving the frame rate 211 or deriving a frame rate from information in the request, the virtual machine 111 can send the frame rate 211 to the guest operating system 115, which can send one or more commands including the frame rate 217 to the virtual machine GPU 107. The one or more commands enable the virtual machine GPU 107 to draw framebuffers to create 219 a remote desktop image 215 at a refresh rate that matches the frame rate. The guest operating system 115 can subsequently transmit the remote desktop image 215 as a media stream with the frame rate to the remote desktop client 102.

Figure 3:
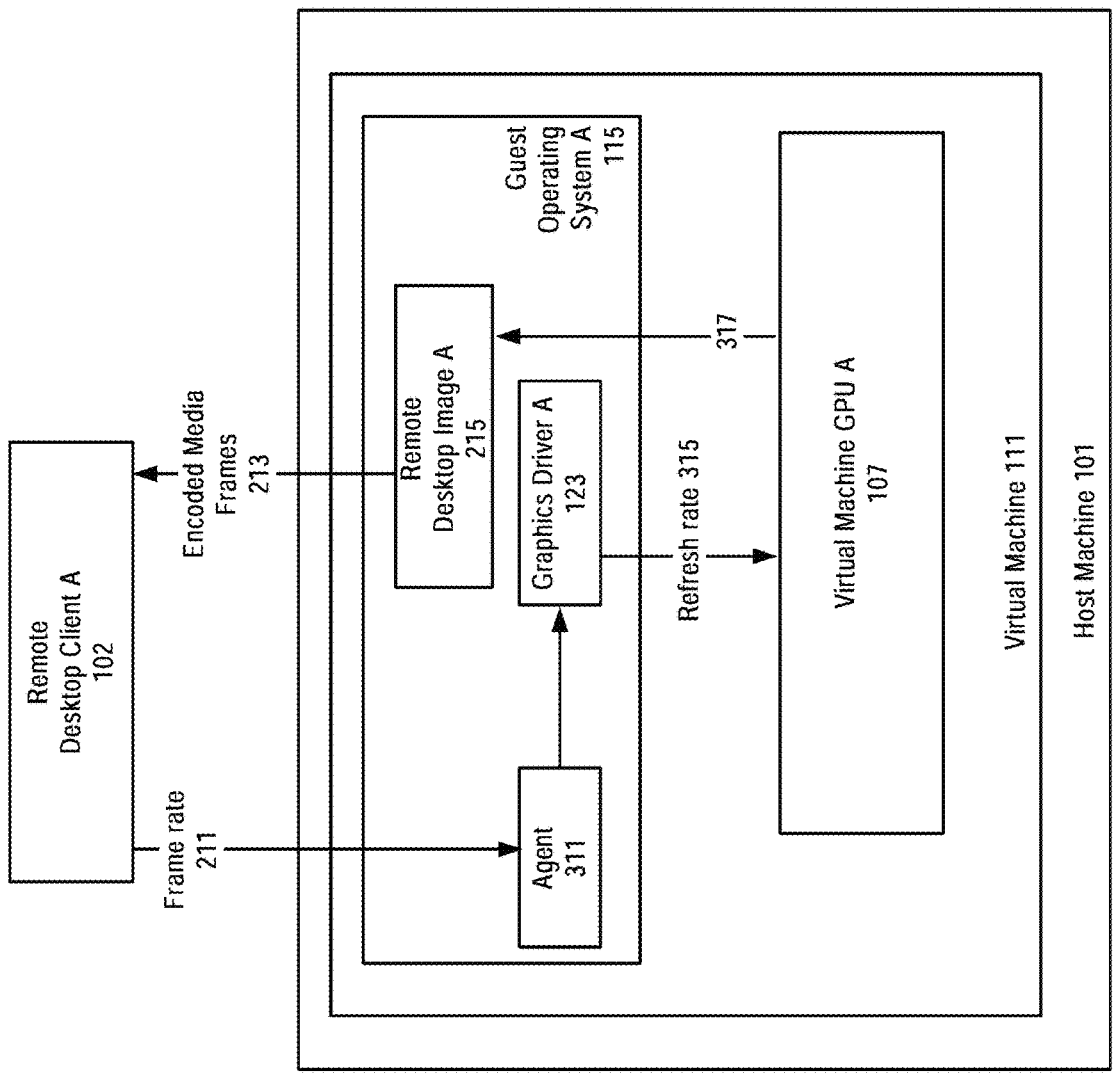
FIG. 3 further illustrates a system for adjusting a virtual machine GPU refresh rate to match a frame rate of a remote desktop stream, in accordance with an embodiment of the invention.

FIG. 3 further illustrates a system for adjusting a virtual machine GPU refresh rate to match a frame rate of a remote desktop stream, in accordance with an embodiment of the invention.

In FIG. 3, an agent 311 in the guest operating system 115 can receive the frame rate 211 from a client request, and can store a value of a refresh rate parameter derived from the frame rate to the graphics driver 123. The graphics driver 123 can adjust a refresh rate of the virtual machine GPU 107 to match the frame rate 211 or the derived fresh rate 315. The adjustment of the refresh rate can be made by changing settings of the virtual machine GPU 107. The derived refresh rate 315 can be a refresh rate of a display device of the remote desktop client 102, and can be derived from the frame rate 211.

In an embodiment, the graphics driver 123, after receiving the desired refresh rate, can report the desired refresh rate to the guest operating system 115. The guest operating system 115 can send one or more commands to the virtual machine GPU 107, to instruct the virtual machine GPU 107 to draw framebuffers at the desired refresh rate to create 317 one or more portions of the remote desktop image 215.

Figure 4:
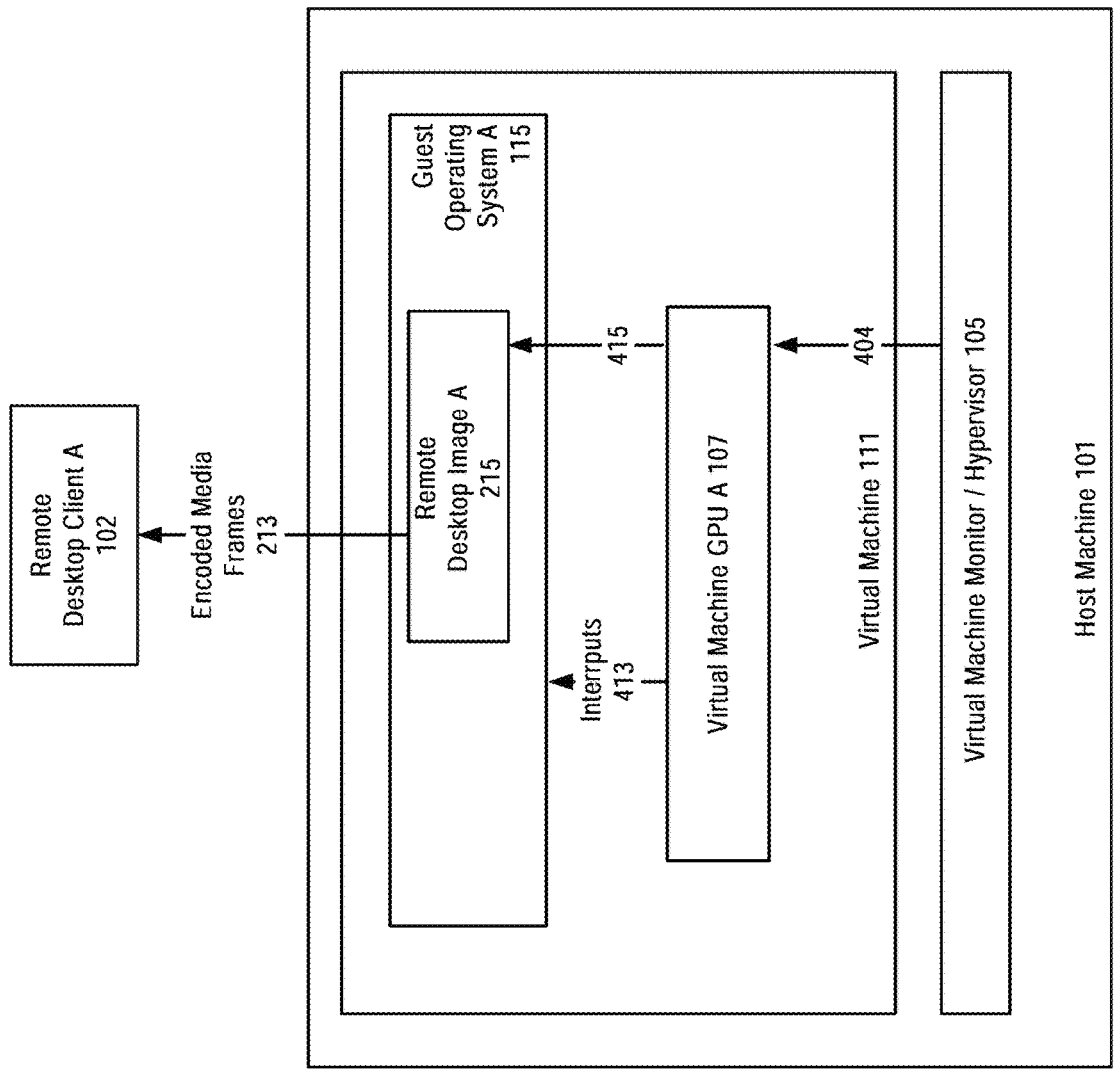
FIG. 4 further illustrates a system for adjusting a virtual machine GPU refresh rate to match a frame rate of a remote desktop stream, in accordance with an embodiment of the invention.

FIG. 4 further illustrates a system for adjusting a virtual machine GPU refresh rate to match a frame rate of a remote desktop stream, in accordance with an embodiment of the invention.

As shown in FIG. 4, in an embodiment, a desired refresh rate 404 can be obtained by the virtual machine GPU 107 from the hypervisor 105. The desired refresh rate 404 can be set by the hypervisor based on one or more conditions of a network used by the remote desktop client 102 to connect to the virtual machine 111. For example, the hypervisor can set a higher desired refresh rate (e.g., 60 Hz) for the virtual machine GPU 107 if a fast network connection is detected by the hypervisor 105, and a lower desired refresh rate (e.g., 30 Hz) if a slow network connection is detected. The virtual machine GPU 107, after obtaining the desired refresh rate from the hypervisor 105 can draw framebuffers at a refresh rate matching the desired refresh rate 404 for creating 415 the remote desktop image 215.

In an example, the virtual machine GPU 107 can also generate interrupts 413 to the guest operating system 115 at the desired refresh rate, to enable the virtual machine 111 to redraw framebuffers at the rate (i.e., refresh rate). In an embodiment, the guest operating system 115, upon receiving the interrupts 413 from the virtual machine GPU 107, can send one or two commands via the graphical driver 123 to the virtual machine GPU 107 for use in drawing or redrawing framebuffers.

Figure 5:
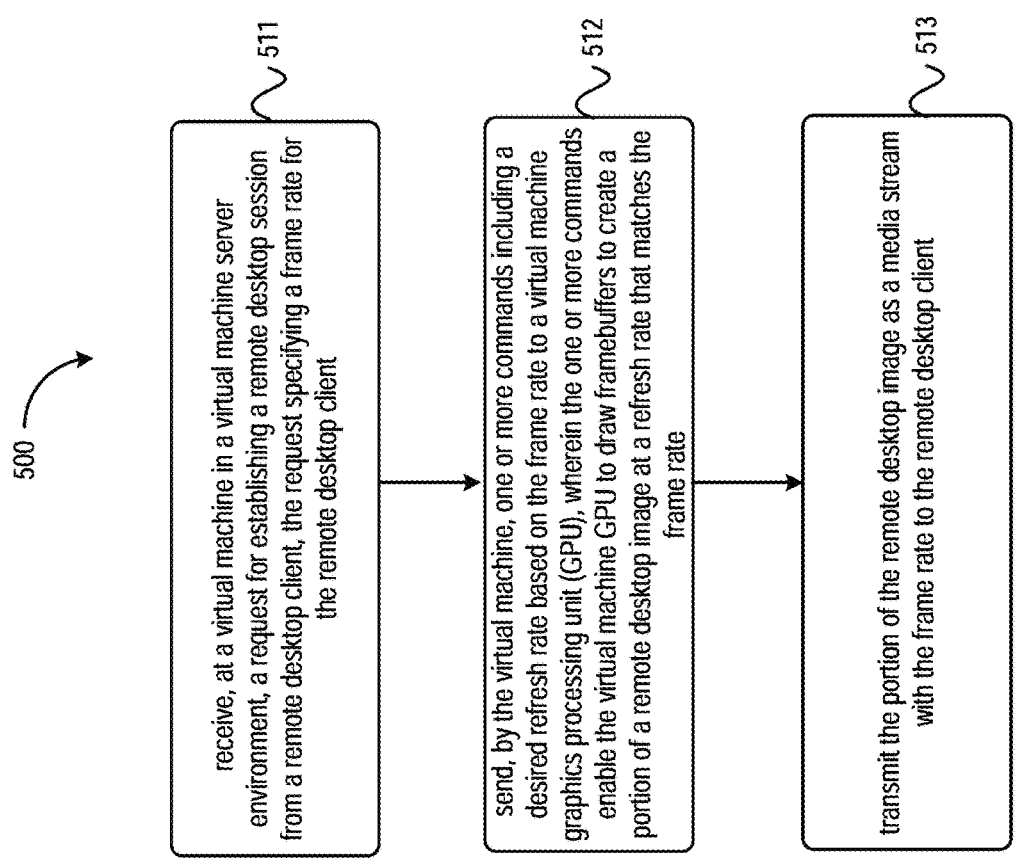
FIG. 5 is a flow diagram illustrating an example method 500 of adjusting a virtual machine GPU refresh rate to match a frame rate of a remote desktop stream, in accordance with an embodiment of the invention.

FIG. 5 is a flow diagram illustrating an example method 500 of adjusting a virtual machine refresh rate to match a frame rate of a remote desktop, in accordance with an embodiment of the invention.

The method 500 may be performed by processing logic that comprises hardware (e.g., circuitry, dedicated logic, programmable logic, microcode, etc.), software (e.g., instructions run on a processing device to perform hardware simulation), or a combination thereof. For example, the method 500 may be performed by one or more of the systems or components described with reference to FIG. 2.

Beginning in block 511, a virtual machine in a virtual machine server environment receives a request for establishing a remote desktop session from a remote desktop client, the request specifying a frame rate for the remote desktop client.

In block 512, the virtual machine sends one or more commands including a desired refresh rate based on the frame rate to a virtual machine graphics processing unit in the virtual machine, wherein the one or more commands enable the virtual machine GPU to draw framebuffers to create a portion of a remote desktop image at a refresh rate that matches the frame rate.

In block 513, the guesting operating system transmits the portion of the remote desktop image as a media stream with the frame rate to the remote desktop client. The remote desktop client receives the portion of the remote desktop image, and displays the portion of the remote desktop image on a display device of the remote desktop client.

Figure 6:
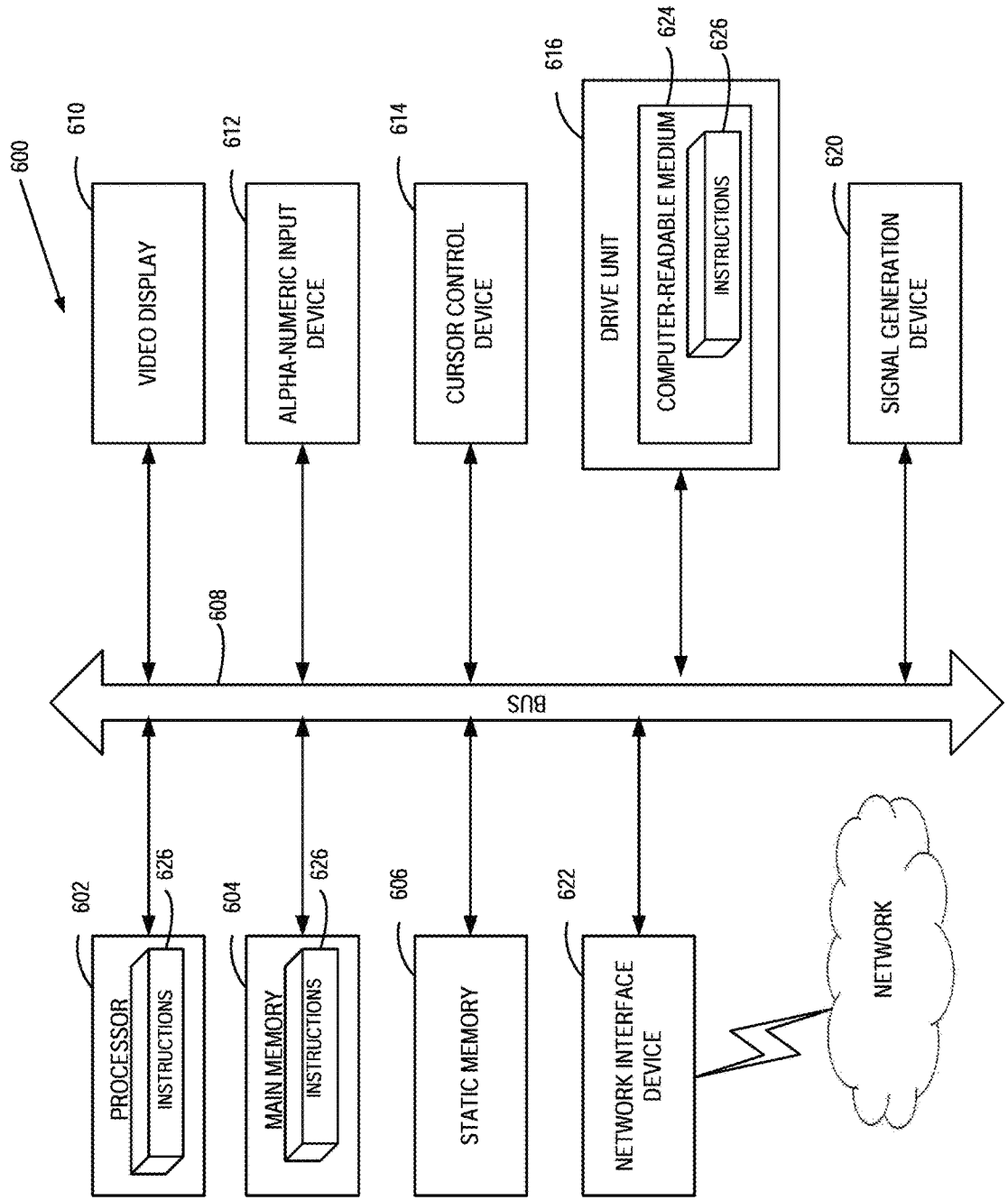
FIG. 6 illustrates a diagrammatic representation of a machine in the example form of a computer system 600 within which a set of instructions, for causing the machine to perform any one or more of the methodologies discussed herein, may be executed.

FIG. 6 illustrates a diagrammatic representation of a machine in the example form of a computer system 600 within which a set of instructions (e.g., framebuffer instructions), for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602 (e.g., a virtual machine GPU), a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626, for performing the operations and steps discussed herein.

The data storage device 618 may include a machine-readable storage medium 628, on which is stored one or more set of instructions 622 embodying any one or more of the methodologies of functions described herein, including instructions to cause the processing device 602 to execute operations such as writing/drawing framebuffers, creating a remote desktop image, and encoding a remote desktop image as described herein. The instructions 622 may also reside, completely or at least partially, within the main memory 404 or within the processing device 602 during execution thereof by the computer system 600; the main memory 604 and the processing device 602 also constituting machine-readable storage media. The instructions 622 may further be transmitted or received over a network 620 via the network interface device 608.

The machine-readable storage medium 628 may also be used to store instructions to perform a method for matching a virtual machine GPU refresh rate to a given frame rate as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof

What is claimed is:

1. A method comprising:
sending, by a processing device executing a virtual machine, a desired refresh rate based on a frame rate to a virtual machine graphics processing unit (GPU) in the virtual machine, wherein the virtual machine GPU to draw framebuffers to create a portion of a remote desktop image at a refresh rate that matches the frame rate; and
transmitting, by the processing device executing the virtual machine, the portion of the remote desktop image with the frame rate to the remote desktop client.

2. The method of claim 1, further comprising receiving, at the virtual machine in a virtual machine server environment, a request to establish a remote desktop session from the remote desktop client.

3. The method of claim 1, wherein the portion of the remote desktop image is transmitted as a media stream.

4. The method of claim 1, wherein the frame rate is determined by a hypervisor.

5. The method of claim 4, wherein the virtual machine GPU refresh rate is to be changed by the hypervisor.

6. The method of claim 2, wherein the frame rate is determined by a plurality of parameters associated with the request, the plurality of parameters characterizing the remote desktop client.

7. The method of claim 6, wherein the plurality of parameters includes one or more of an operating system, a protocol version, a size of a display device, or a refresh rate of the display device.

8. The method of claim 1, wherein the virtual machine GPU comprises a software abstraction.

9. The method of claim 1, wherein the virtual machine GPU comprises a partition.

10. A system comprising:
a memory device;
a processing device operatively coupled to the memory device, the processing device to:
send, by a virtual machine in a virtual machine server environment, a desired refresh rate based on a frame rate to a virtual machine graphics processing unit in the virtual machine, wherein the virtual machine GPU to draw framebuffers to create a portion of a remote desktop image at a refresh rate that matches the frame rate; and
transmit the portion of the remote desktop image with the frame rate to the remote desktop client.

11. The system of claim 10, wherein the processing device further to receive, at the virtual, a request to establish a remote desktop session from the remote desktop client.

12. The system of claim 10, wherein the portion of the remote desktop image is transmitted as a media stream.

13. The system of claim 10, wherein the frame rate is determined by a hypervisor in the virtual machine server environment.

14. The system of claim 10, wherein the virtual machine GPU refresh rate is to be changed by the hypervisor.

15. The system of claim 10, wherein the frame rate is determined by a plurality of parameters associated with the request, the plurality of parameters characterizing the remote desktop client.

16. The system of claim 15, wherein the plurality of parameters includes one or more of an operating system, a protocol version, a size of a display device, or a refresh rate of the display device.

17. The method of claim 10, wherein the virtual machine server environment executes on one or more host machines, and includes a plurality of virtual machines managed by a hypervisor.

18. The method of claim 10, wherein the virtual machine GPU is a whole GPU.

19. A non-transitory computer-readable medium including instructions that, when executed by a processing device, cause the processing device to:
send, by the processing device executing a remote desktop client, a request to establish a remote desktop session between the remote desktop client and a virtual machine, the request specifying a frame rate for the remote desktop client;
receive, by the processing device, one or more portions of a remote desktop image with the frame rate to the remote desktop client; and
display the one or more portions of the remote desktop image on a display device of the remote desktop client.

20. The non-transitory computer-readable medium of claim 19, wherein the frame rate is determined by a parameter associated with the request.

* * * * *